(12) United States Patent
Lee

(10) Patent No.: US 11,349,168 B2
(45) Date of Patent: May 31, 2022

(54) BATTERY PACK

(71) Applicant: LG CHEM, LTD., Seoul (KR)

(72) Inventor: Bum Jick Lee, Cheongju-Si (KR)

(73) Assignee: LG ENERGY SOLUTION, LTD., Seoul (KR)

(*) Notice: Subject to any disclaimer, the term of this patent is extended or adjusted under 35 U.S.C. 154(b) by 122 days.

(21) Appl. No.: 16/482,223

(22) PCT Filed: Feb. 21, 2018

(86) PCT No.: PCT/KR2018/002135
§ 371 (c)(1),
(2) Date: Jul. 30, 2019

(87) PCT Pub. No.: WO2019/017547
PCT Pub. Date: Jan. 24, 2019

(65) Prior Publication Data
US 2020/0044202 A1    Feb. 6, 2020

(30) Foreign Application Priority Data

Jul. 21, 2017 (KR) .......................... 10-2017-0092729

(51) Int. Cl.
*H01M 50/166* (2021.01)
*H01M 50/116* (2021.01)
*H01M 10/42* (2006.01)
*G09F 3/10* (2006.01)

(52) U.S. Cl.
CPC ............ *H01M 50/116* (2021.01); *G09F 3/10* (2013.01); *H01M 10/4257* (2013.01); *H01M 50/166* (2021.01)

(58) Field of Classification Search
CPC ............ H01M 50/116; H01M 50/166; H01M 10/4257; G09F 3/10
See application file for complete search history.

(56) References Cited

U.S. PATENT DOCUMENTS

| | | |
|---|---|---|
| 2008/0305367 A1 | 12/2008 | Baek et al. |
| 2014/0072831 A1 | 3/2014 | Wang et al. |
| 2014/0141289 A1 | 5/2014 | Choi et al. |
| 2014/0248515 A1 | 9/2014 | Wayne et al. |
| 2015/0147599 A1 | 5/2015 | Lee |
| 2016/0072160 A1 | 3/2016 | Hwang |

(Continued)

FOREIGN PATENT DOCUMENTS

| | | |
|---|---|---|
| CN | 203026566 U | 6/2013 |
| CN | 20326064 U | 10/2013 |
| CN | 203950871 U | 11/2014 |

(Continued)

OTHER PUBLICATIONS

Morita Hideyo; Ono Yasuhiro, Pack Battery, Obtained Jan. 28, 2020, Espacenet Machine Translation (Description) (Year: 2005).*

(Continued)

*Primary Examiner* — Milton I Cano
*Assistant Examiner* — Jenna Shulman
(74) *Attorney, Agent, or Firm* — Birch, Stewart, Kolasch & Birch, LLP

(57) ABSTRACT

A battery pack, and more particularly, to a battery pack in which a label wrapping a battery cell coupled to a PCM has a thin shape, which does not have an overlapping portion.

6 Claims, 6 Drawing Sheets

(56) References Cited

U.S. PATENT DOCUMENTS

| | | |
|---|---|---|
| 2016/0211493 A1 | 7/2016 | Kim et al. |
| 2016/0226038 A1 | 8/2016 | Kim et al. |

FOREIGN PATENT DOCUMENTS

| | | |
|---|---|---|
| CN | 204332246 U | 5/2015 |
| CN | 106876622 A | 6/2017 |
| JP | H10-50279 A | 2/1998 |
| JP | 2002-151031 A | 5/2002 |
| JP | 2003-68267 A | 3/2003 |
| JP | 2003-77435 A | 3/2003 |
| JP | 2005-135837 A | 5/2005 |
| JP | 2006-294566 A | 10/2006 |
| JP | 2008-171582 A | 7/2008 |
| JP | 2009-124875 A | 6/2009 |
| JP | 2009-187785 A | 8/2009 |
| JP | 2009-224049 A | 10/2009 |
| JP | 2014-120369 A | 6/2014 |
| JP | 2014-526124 A | 10/2014 |
| JP | 2015-211022 A | 11/2015 |
| JP | 2016-532245 A | 10/2016 |
| KR | 10-0878285 B1 | 1/2009 |
| KR | 10-2014-0004835 A | 1/2014 |
| KR | 10-2014-0035205 A | 3/2014 |
| KR | 10-1504275 B1 | 3/2015 |
| KR | 10-2015-0037040 A | 4/2015 |
| KR | 10-2015-0037222 A | 4/2015 |
| KR | 10-2016-0028749 A | 3/2016 |
| WO | WO 2014/007510 A1 | 1/2014 |

OTHER PUBLICATIONS

Ueda Tomotaka,Battery, Obtained Jan. 28, 2020, Espacenet Machine Translation (Description) (Year: 2002).*
International Search Report (PCT/ISA/210) issued in PCT/KR2018/002135, dated Jun. 4, 2018.
European Search Report for Appl. No. 18834684.5 dated Mar. 19, 2020.

* cited by examiner

Prior Art

[Fig. 3]
(a)
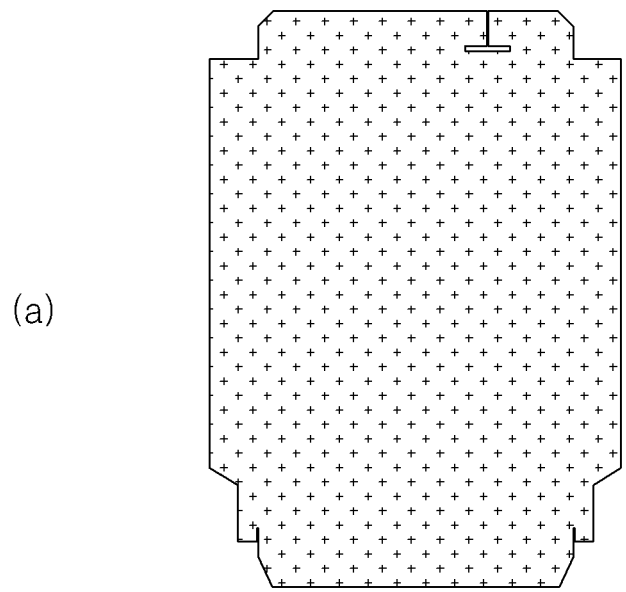
(b)
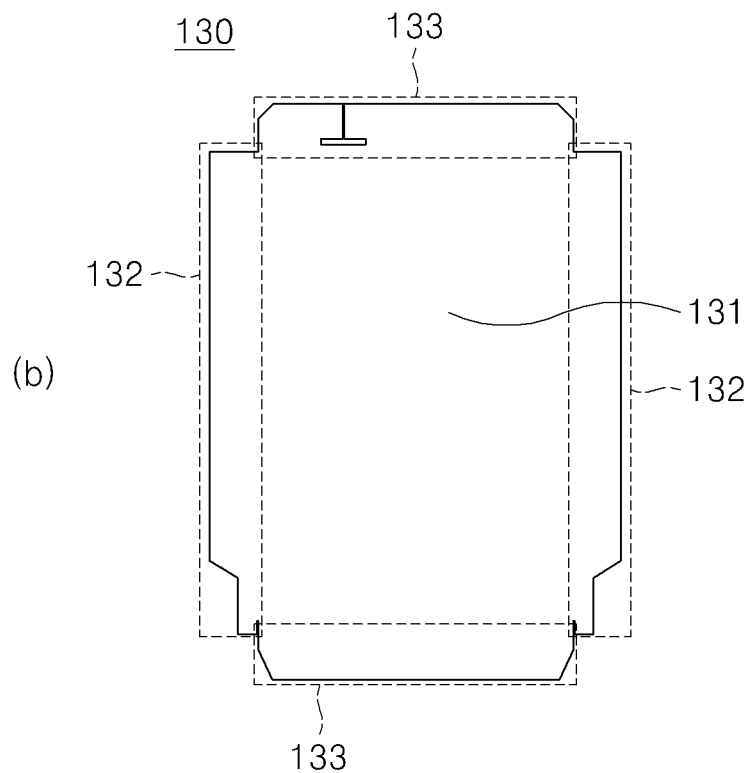

[Fig. 4]
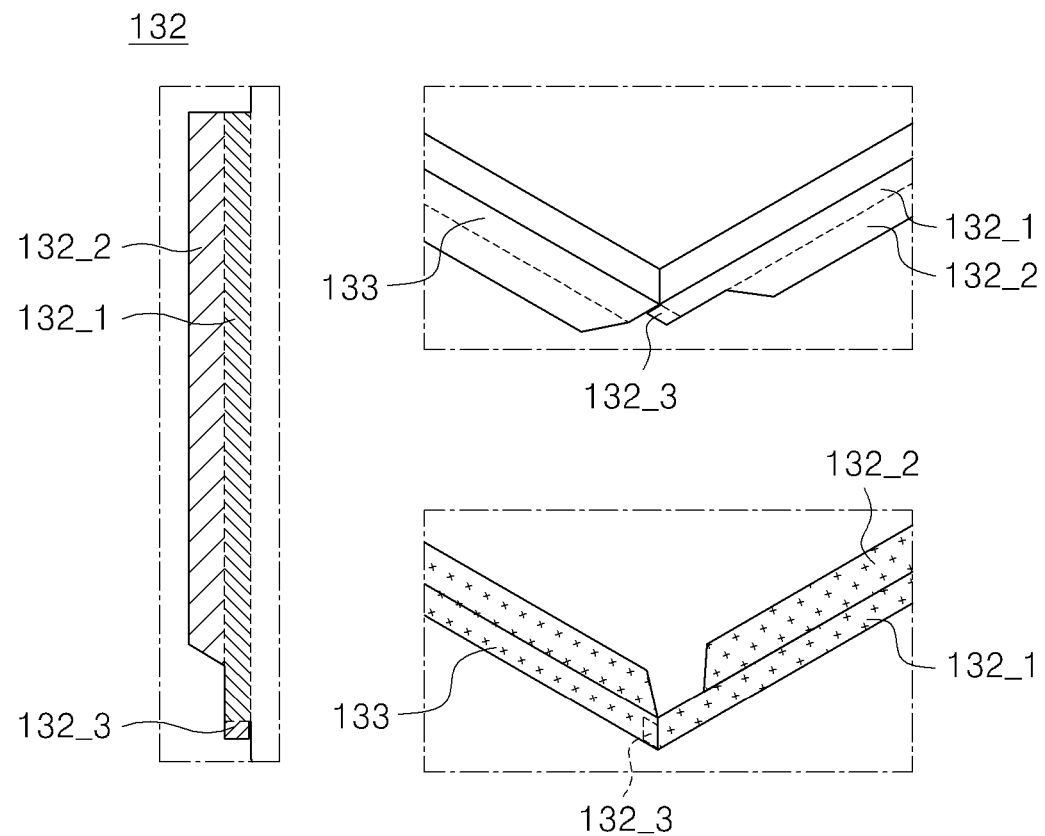

[Fig. 5]
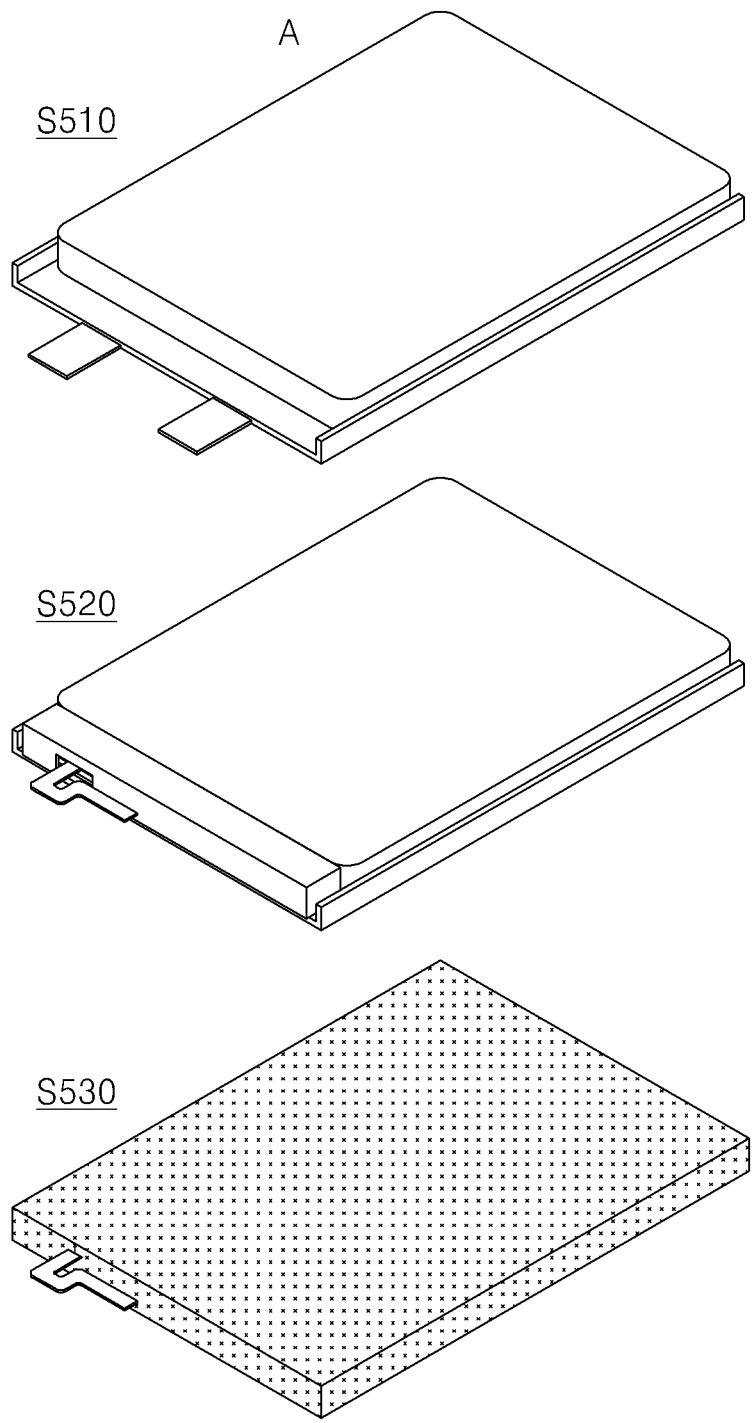

[Fig. 6]
S531
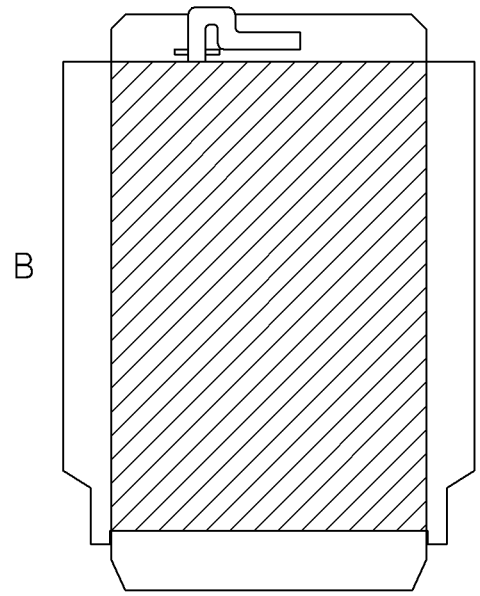
B
S532
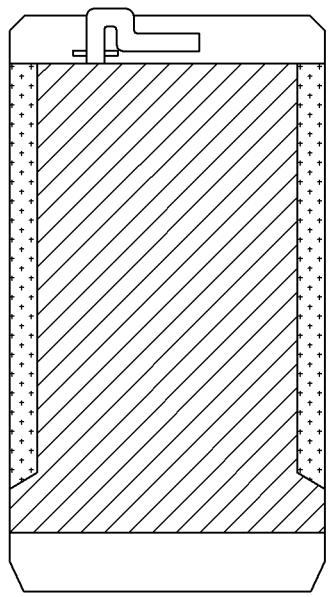
S533
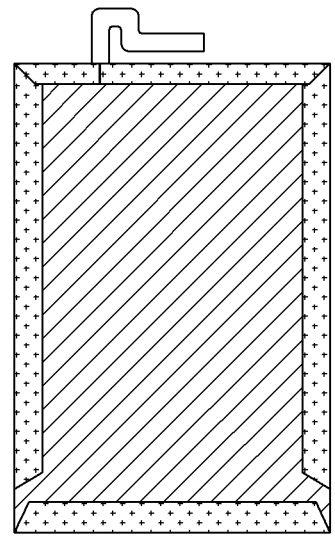

BATTERY PACK

TECHNICAL FIELD

The present invention relates to a battery pack, and more particularly, to a battery pack including a label wrapping a battery cell coupled to a PCM and having a thin shape which does not have an overlapping portion.

BACKGROUND ART

A pouch type lithium secondary battery that is a unit cell constituting a battery pack has flexibility and also has a relatively free shape, is lightweight, and has excellent safety, and thus, demand for portable electronic devices such as mobile phones, camcorders, and notebook computers is increasing.

Also, the shape of the battery pack is classified according to the shape of the battery case. When an electrode assembly is built in a cylindrical or prismatic metal can, the battery pack is classified into a cylindrical type battery pack and a prismatic type battery pack.

Also, when the electrode assembly is built in a pouch type case made of an aluminum-laminated sheet, the battery pack is classified into a pouch type battery pack.

Also, the electrode assembly built in the battery case may include a positive electrode, a negative electrode, and a separator inserted between the positive electrode and the negative electrode and thus be chargeable/dischargeable.

Also, the electrode assembly may be classified into a jelly-roll-type in which a positive electrode, a separator, and a negative electrode, each of which has a long sheet shape coated with an electrode active material, are sequentially laminated and then wound and a stacked type in which a plurality of positive electrodes, separators, and negative electrodes, each of which is coated with an electrode active material and has a predetermined size, are sequentially laminated according to the shape thereof.

The battery pack has an outer surface on which various kinds of pieces of information (battery manufacturer, model name, product number, various standards and quality indications, usage precautions, and the like) of the corresponding battery are displayed in the form of letters or marks.

Such information may be displayed in a manner in which the pieces of information are previously printed on an outer case of the battery. However, when the battery pack is mounted on an external device such as a mobile phone or a notebook computer, a label printed with the information may be attached to the outer surface of the finished battery pack.

Also, the label may be made of paper, vinyl-coated paper, a polymer resin material, a thin film metal material, or the like and may be attached to the battery pack in the form of a kind of sticker coated with an adhesive on a rear surface of the label.

Also, the label made of paper, vinyl-coated paper, a polymer resin, etc. may be manufactured to be very light and thin, be resistant to an impact, be formed in any shape, for example, a curved shape, and have high transparency when compared to that made of the thin film metal material, and thus, its use is being expanding because of the various advantages thereof.

The conventional battery pack to which the label is attached will be described in detail with reference to FIG. 1.

FIG. 1 is a view illustrating a structure of a battery pack to which a label is attached according to the related art.

Referring to FIG. 1, the label has not only information on the battery but also has insulating properties and thus covers the whole battery pack to allow edges thereof to overlap each other.

However, although the label has to be removed to increase a thickness of the battery cell or reduce a thickness of the battery pack due to increasing demands for a large capacity battery and a thin battery in a limited space, if each of the edges of the battery pack is exposed, the battery pack may be short-circuited, and thus, it is difficult to remove the label configuration.

Therefore, it is required to develop a technique that reduces a thickness of the battery pack and prevents the short circuit from occurring.

PRIOR ART DOCUMENTS

Patent Documents (Patent Document 1) KR2015-0037222 A

DISCLOSURE OF THE INVENTION

Technical Problem

The present invention provides a battery pack that prevents short circuit from occurring and is reduced in thickness.

Technical Solution

A battery pack according to an embodiment of the present invention includes: a battery cell provided with a lead part including a positive lead and a negative lead; a protection circuit module (PCM) including a protection circuit for controlling an operation of the battery cell and electrically connected and coupled to the lead part of the battery cell; and a label wrapping the battery cell, to which the PCM is coupled, so that portions of the label attached to a rear surface of the battery cell in a thickness direction of the battery cell are attached as a single layer without the portions of the label overlapping each other.

The battery cell may include an electrode assembly and a case accommodating the electrode assembly, and the label surrounds ends of the case.

The PCM may include an external input/output terminal on one side thereof to electrically connect the hammy cell to an external device.

The label may include: a front adhesion part attached to a front surface of the battery cell; a first side adhesion part attached to a left surface of the battery cell and a portion of the rear surface of the battery cell; a second side adhesion part attached to a right surface of the battery cell and a portion of the rear surface of the battery cell; an upper adhesion part attached to a top surface of the battery cell and a portion of the rear surface of the battery cell; and a lower adhesion part attached to a bottom surface of the battery cell and a portion of the rear surface of the battery cell.

Each side adhesion part may include: a side attachment part attached to a side surface of the battery cell; and a rear attachment part attached to a portion of the rear surface of the battery cell.

Each side adhesion part may further include a fixing attachment part overlapping the upper adhesion part or the lower adhesion part in a longitudinal direction of the battery cell An upper end of the rear attachment part may the provided at the same position as an upper end of the side attachment part to match flatness of the rear surface of the battery cell, and a lower end of the rear attachment part may be spaced upward from a lower end of the side attachment part so that the rear attachment part does not overlap the upper adhesion part or the lower adhesion part.

A terminal part through which an external input/output terminal passes may be provided in the upper adhesion part.

The label may be made of an electrically insulating material.

A method for manufacturing a battery back according to an embodiment of the present invention includes: a battery cell preparation step of preparing a battery cell including an electrode assembly and an electrolyte; a protection circuit module (PCM) mounting step of a PCM on the battery cell prepared in the battery cell preparation step; and a labeling step of attaching a label on one surface of the battery cell on which the PCM is mounted through the PCM mounding step.

The labeling step may include: a front attachment step of attaching a front adhesion part of the label on a front surface of the battery cell; a side atta.chment step of attaching a side attachment part of a side adhesion part of the label on a side surface of the battery cell; a rear attachment step of attaching a rear attachment part of the side adhesion part of the label on a rear surface of the battery cell; an upper attachment step of attaching an upper adhesion part of the label on a top surface of the battery cell; and a lower attachment step of attaching a lower adhesion part of the label on a bottom surface of the battery cell.

The method may further include, before the upper/lower attachment step, a terminal part formation step of forming a terminal part through which an external input/output terminal passes, in the upper adhesion part.

Advantageous Effects

The battery pack according to the embodiment of the present invention may include the label wrapping the edge of the battery cell and having the shape which does not have the overlapping portion on the rear surface thereof to reduce the total thickness of the battery and prevent the short circuit from occurring at the end edge.

BRIEF DESCRIPTION OF THE DRAWINGS

FIG. 3 is a view illustrating structures of an outer surface and an inner surface of a label within the battery pack according to an embodiment of the present invention.

FIG. 4 is a view illustrating a structure of a side adhesion part of the label within the battery pack according to an embodiment of the present invention.

FIG. 5 is a schematic view illustrating a method for manufacturing a battery pack according to an embodiment of the present invention.

FIG. 6 is a schematic view illustrating a labeling step of the method for manufacturing the battery pack according to an embodiment of the present invention.

MODE FOR CARRYING OUT THE INVENTION

Hereinafter, embodiments of the present invention will be described in detail with reference to the accompanying drawings. However, the present invention is not restricted or limited by the embodiments. Rather, the embodiments are provided so that the disclosure of the present invention is thorough and complete and fully conveys the scope of the present invention to those skilled in the art.

The term "first", "second" or the like may be used for describing various elements but does not limit the elements. Such terms are only used for distinguishing one element from other elements. For example, without departing the scope of the present invention, a first element may be referred to as a second element, and likewise, a second element may be referred to as a first element. The terminology used herein is not for delimiting the present invention but for describing specific embodiments. The terms of a singular form may include plural forms unless otherwise specified.

The terms used herein have been selected from among general terms that are widely used at the present time in consideration of the functions of the present invention, but may be changed depending on intentions of those skilled in the art, judicial precedents, or the advent of new technology. Furthermore, specific terms have been arbitrarily selected by the applicant, and the meanings of such terms will be described in detail in relevant sections of the description. Therefore, it should be understood that the terms used herein should not be simply defined literally but should be defined on the basis of the meanings of the terms and the overall contents of the present disclosure.

Embodiment 1

Hereinafter, a battery pack in accordance with an exemplary embodiment will be described.

A battery pack according to an embodiment of the present invention includes a label wrapping an edge thereof and having no overlapping portion so as to fix a battery cell to which a PCM is coupled and provide insulating properties. Thus, the battery pack may have a reduced thickness when compared with that of the existing battery pack and prevent short circuit from occurring at the edge.

Figure 1:
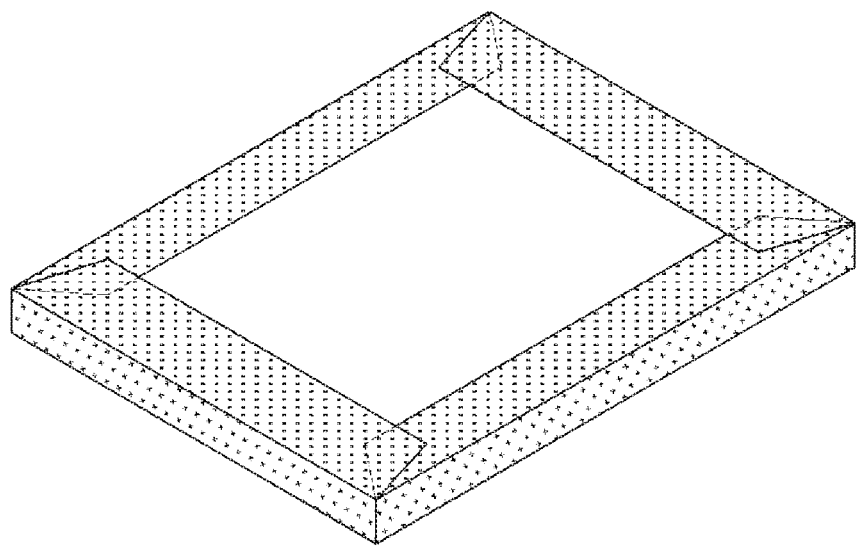
FIG. 1 is a view illustrating a structure of a battery pack to which a label is attached according to a related art.
Figure 2:
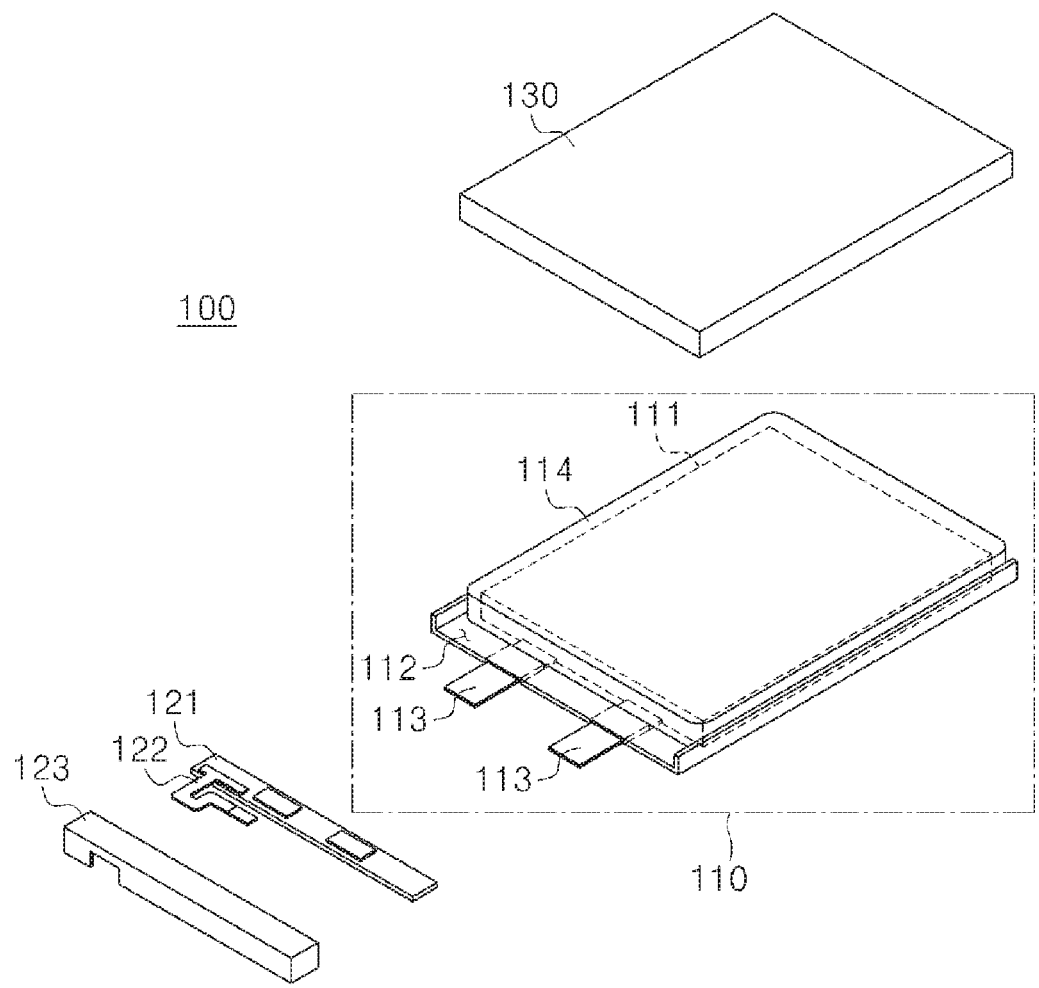
FIG. 2 is an exploded perspective view of a battery pack according to an embodiment of the present invention.

FIG. 2 is an exploded perspective view of the battery pack according to an embodiment of the present invention.

Referring to FIG. 2, a battery pack 100 according to an embodiment of the present invention includes a battery cell 110 provided with a lead part including a positive electrode lead and a negative electrode lead, a protection circuit module (P(M) 120 including a protection circuit for controlling an operation of the battery cell 110 and electrically connected and coupled to the lead part of the battery cell, and a label wrapping the battery cell 110, to which the PCM 120 is coupled, so that a portion of the label attached to a bottom surface of the battery cell 110 in a thickness direction is attached as a single layer without portions of the label overlapping each other.

A configuration of the battery pack 100 will be described below in more detail.

Also, the battery cell 110 includes a lead part 113 including the positive electrode lead and the negative electrode lead. In general, since a lithium secondary battery is used as the battery cell, the battery cell include an electrode assembly 111 in which a plurality of positive electrodes (aluminum foil) and negative electrodes (copper foil) are laminated with a separator therebetween and a case 114 wrapping the electrode assembly 111 by using an aluminum pouch to seal the electrode assembly 111.

Also, a PCM accommodation part 112 accommodating the PCM 120 may be formed in an upper end of the case 114 so that the PCM 120 is stably coupled.

Also, the electrode assembly 111 is accommodated in a battery cell accommodation region within the case 114 provided in a region that does not overlap the PCM accommodation part 112.

Also, the PCM accommodation part 112 may be maintained in the insulation state by applying an insulating material such as an insulation tape therein.

Also, the lead part 113 is fused to an upper end of the case 114. The lead part 113 is electrically connected to a tab of the electrode assembly 111. The lead part 113 extending into the case and the tab of the electrode assembly 111 may be welded to each other to electrically connect the electrode assembly 111 to the case 114.

Also, the battery cell 110 includes an electrolyte therein. Thus, the electrolyte may come into contact with the electrode assembly while the battery cell is repeatedly charged and discharged to function as a medium for transferring lithium ions to the positive electrode or the negative electrode of the electrode assembly.

Also, the PCM 120 includes the protection circuit for controlling the operation of the battery cell and is electrically connected and coupled to the lead part of the battery cell.

In more detail, the PCM 120 includes a printed circuit board (PCB) 121 which is connected to the lead part 113 of the battery cell and on which the protection circuit is mounted, an external input/output terminal 122 bonded to the PCB 121 to electrically connect the PCB 121 to an external device, and a top cover 123 wrapping and protecting the PCB 121 to which the input/output terminal 122 is bonded.

The PCB 121 includes the protection circuit for controlling the operation of the battery cell 111, is connected to the lead part 113 of the battery cell, and is mounted on the PCM accommodation part 112 provided in the upper end of the case 114.

Also, the PCB 121 may include a safety element including a passive element such as a resistor and a condenser or an active element such as a field-effect transistor or a protection element in which integrated circuits are provided to prevent the battery cell 110 from being overheated and exploded by overcharging, overdischarging, or overcurrent.

Also, the PCB 121 may include the external input/output terminal 122 receiving power from the battery pack 100 or allowing the battery pack 100 to be electrically connected to the external device for supplying power to the battery pack 100.

Here, a shape of the external input/output terminal 122 is not limited to that of FIG. 2, and thus, the external input/output terminal 122 may be variously modified in shape according to user's demands.

The top cover 123 may wrap and protect the PCB 121 to which the external input/output terminal 122 is bonded and be made of a polymer material having low conductivity.

Here, the polymer material may include at least one or more of polyethylene (PE), polypropylene (PP), polystyrene (PS), polyethylene terephthalate (PET), polyamide (PA, nylon), polyester (PES), polyvinyl chloride (PVC), polyurethanes (PU), polycarbonate (PC), polyvinylidene chloride (PVDC), polytetrafluoroethylene (PTFE, Teflon), polyetheretherketone (PEEK, polyketone), and polyetherimide (PEI, Ultem).

Also, the top cover 123 has a through-groove defined in an upper end thereof so that the external input/output terminal 122 connected to the PCB 121 passes to the outside of the top cover 123.

The label 130 will be described in more detail with reference to FIG. 3.

FIG. 3 is a view illustrating structures of an outer surface and an inner surface of the label within the battery pack according to an embodiment of the present invention. Here, FIG. 3-(*a*) is a view illustrating an outer surface of the label, and FIG. 3-(*b*) is a view illustrating an inner surface of the label.

Referring to FIG. 3, the label 130 wraps the battery cell, to which the PCM 120 is coupled, so that a portion of the label attached to a bottom surface of the battery cell 110 in a thickness direction is attached as a single layer without portions of the label overlapping each other.

Thus, each of ends of the edges of the case 114 to which the PCM 120 is coupled may be finished to prevent short circuit from occurring at the ends.

Thus, the label 130 is made of an insulating material to also prevent static electricity from being introduced from the outside.

Also, the label 130 is made of paper, vinyl-coated paper, a polymer resin material, a thin film metal material, or the like, and an adhesion component is applied or attached to the inner surface illustrated in FIG. 3-(*b*).

Also, the inner surface of the label illustrated in FIG. 3-(*b*) includes a front adhesion part 131 attached to a front surface of the battery cell, a side adhesion part 132 attached to each of left and right surfaces and a portion of a rear surface of the battery cell, and upper/lower adhesion parts 133 attached to top and bottom surfaces and a portion of a rear surface of the battery cell.

In more detail, the front adhesion part 131 is attached to the front surface of the battery cell. Here, the front surface of the battery cell may mean a surface in which the PCB 121 of FIG. 2 is accommodated in the PCM accommodation part 112 of the battery cell 110.

Also, the side adhesion part 132 is attached to the left and right surfaces and a portion of the rear surface of the battery cell and will be described in more detail with reference to FIG. 4.

FIG. 4 is a view illustrating a structure of the side adhesion part of the label within the battery pack according to an embodiment of the present invention.

Referring to FIG. 4, the side adhesion part 132 includes a side attachment part 132_1 attached to the side surface of the battery cell and a rear attachment part 132_2 attached to a portion of the rear surface of the battery cell.

Also, the side attachment part 132_1 is attached to the entire side surface of the battery cell 110 to protect the edge of the battery cell.

Also, an upper portion of the rear attachment part 132_2 has the same length as the side attachment part 132_1 to match flatness of the rear surface of the battery cell.

Also, a lower portion of the rear attachment part 132_2 has a length less than that of the side attachment part 132_1 so that the lower portion of the rear attachment part 132 2 does not overlap the lower adhesion part of the upper/lower adhesion parts 133.

Thus, when the battery cell 110 is coupled to the PCM 120, force is applied to a rear surface of the PCM accommodation part 112, and thus, the rear surface of the PCM accommodation part 112 is slightly bent. As a result, only an upper portion of the rear attachment part 132_2 overlaps the upper adhesion part to match the flatness.

However, when the rear surface of the PCM accommodation part 112 is not bent, the structure of the lower portion may be provided in the upper portion of the rear attachment part 132_2 so that all the top and bottom surfaces do not overlap the rear attachment part 132_2.

Also, as an embodiment, when the label has a thickness of 0.03 mm, conventional labels, each of which has a thickness of 0.05 mm, overlap each other in triplicate so that the label having a thickness of 0.15 mm is reduced to a thickness of 0.06 mm.

Thus, the thickness of the battery cell may increase by a thickness of 0.09 mm to increase the capacity of the battery pack.

However, the thickness of the label is not limited to 0.03 mm and may have a thickness of 0.01 mm to 0.04 mm.

Also, the side adhesion part 132 may further include a fixing attachment part 132_3 that overlaps the upper/lower adhesion parts 133 in a longitudinal direction of the battery cell. The fixing attachment part 132_3 may not have an influence on the thickness of the battery pack 100 and may firmly couple the structure of the battery pack to increase an insulation effect of the edge.

Also, the upper/lower adhesion parts 133 may be attached to the top and bottom surfaces and the portion of the rear surface of the battery cell, respectively. The upper adhesion part may overlap the side adhesion part 132, and the lower adhesion part may not overlap the side adhesion part 132.

Also, the upper adhesion part of the upper/lower adhesion parts 133 may include a terminal part through which the external input/output terminal passes to allow the label 130 to be easily attached to the battery cell 110. Here, the terminal part may be cut up to an end of the label and thus more easily attached.

Embodiment 2

Hereinafter, a method for manufacturing a battery pack according to an embodiment of the present invention will be described.

In the method for manufacturing the battery pack according to an embodiment of the present invention, a PCM is mounted on a battery cell, and a label is attached to the battery cell on which the PCM is mounted so that the label does not overlap itself. Thus, the battery pack may be reduced in thickness to prevent short circuit from occurring at an edge of the battery cell.

FIG. 5 is a schematic view illustrating the method for manufacturing the battery pack according to an embodiment of the present invention.

Referring to FIG. 5, in the method for manufacturing the battery pack according to an embodiment of the present invention, a battery cell including an electrode assembly and an electrolyte is prepared (a battery cell preparation step: S510), and a protection circuit module (PCM) is mounted on the battery cell prepared in the battery cell preparation step (a PCM mounting step: S520).

Then, a prepared label is attached on one surface of the battery cell on which the PCM is mounted (a labeling step: S530).

Also, each of the steps in the method for manufacturing the battery pack will be described below in more detail.

The battery cell preparation step (S510) is a step of preparing the battery cell having a pouch shape in which an electrode assembly and an electrolyte are sealed. Here, various pouch-type battery cells such as a lithium polymer cell, a nickel cadmium cell, a nickel hydrogen cell, a nickel zinc cell, and the like as well as the lithium ion cell may be prepared.

For example, in the lithium ion battery preparation process, a plurality of positive electrodes (aluminum foil) and negative electrodes (copper foil) are laminated with a separator therebetween to form the battery cell. Furthermore, a positive electrode tab is welded to the positive electrode, and a negative electrode tab is welded to the negative electrode to form a structure that is wrapped and sealed by using an aluminum pouch.

In more detail, the process of manufacturing the battery cell is largely divided into three processes such as an electrode process, an assembly process, and an activation process.

First, in the electrode process, material's for forming the positive electrode and the negative electrode are mixed with each other at an appropriate ratio. Then, the positive electrode is coated with aluminum, and the negative electrode is coated with copper foil. Thereafter, a roll press process is performed to form a flat shape having a predetermined thickness, and a slitting process is performed to be sliced to match an electrode size.

Also, in the assembly process, a notching process for removing an unnecessary portion from the electrode is performed, and a positive electrode material, a separator, and a negative electrode material are alternately laminated on top of another. Then, a stack and folding process for folding the laminate several times according to capacity of the battery or a winding process for overlapping and rolling the electrodes and the separator are performed. Thereafter, the laminate is packaged by using an aluminum film package, and then, an electrolyte is injected, and then, a sealing process for generating a vacuum state is performed.

Finally, in the activation (formation) process, the assembled battery cell, the assembled battery cell is repeatedly charged and discharged to activate the battery cell. The activation process is a process for performing a degassing process for exhausting a gas generated in the battery cell when being activated.

Also, after the battery cell is prepared, the electrode assembly prepared in the electrode process is mounted in an electrode assembly accommodation part of a case including the electrode assembly accommodation part, a lead part, and a PCM accommodation part.

Then, a tab of the mounted electrode assembly and the lead part of the case are electrically coupled to each other, through welding or the like, and then, the pouch is fused to complete the battery cell.

Also, the PCM mounting step (S520) is a step of mounting the PCM 120 on the battery cell prepared in the battery cell preparation step (S510). Here, the lead of the battery cell 110 is coupled to the PCM 120 through spot welding or soldering.

In more detail, an external input/output terminal 122 is bonded to the PCB 121, and then, the lead of the battery cell and the PCB 121 are spot-welded or soldered.

Then, the PCB 121 is seated in the PCM accommodation part 112 within the case, and the top cover 123 is covered on the PCB 121 seated in the PCM accommodation part 112.

A positive (+) electrode/a negative (−) electrode of the lead part 113 is bent toward the PCB accommodation part 112.

Also, the labeling step (S530) is a step of attaching a label on one surface of the battery cell on which the PCM is mounted through the PCM mounting step (S520). This step will be described below in more detail.

FIG. 6 is a schematic view illustrating the labeling step of the method for manufacturing the battery pack according to an embodiment of the present invention.

First, FIG. 5 illustrates a surface A of he battery pack, and FIG. 6 illustrates a surface B of the battery pack. That is, FIG. 5 is a schematic view of a front surface on which the PCM and the battery cell are coupled to each other, and FIG. 6 is a schematic view of a rear surface opposite to the front surface.

Referring to FIG. 6, a front adhesion part of the label is attached to the front surface of the battery cell (a front attachment step: S531), and a side adhesion part of the label is attached to a side surface of the battery cell (a side attachment step: S532).

Thereafter, upper/lower adhesion parts of the label are respectively attached to top/bottom surfaces of the battery cell (upper/lower attachment step (S533).

In more detail, when the front adhesion part of the label is attached to the front surface of the battery cell in the front attachment step (S531), the side attachment part of the label is attached to the side surface of the battery cell, and then the rear attachment part is attached (the side attachment step: S532).

Then, if a fixing attachment part is provided, the fixing attachment part of the remaining side adhesion part is attached to each of the top/bottom surfaces of the battery cell.

Also, in the upper/lower attachment step (S533), the upper/lower adhesion parts are attached one by one regardless of the order because the upper adhesion part is separated by the external input/output terminal.

Also, before the upper/lower attachment step, a terminal part formation step of forming a terminal part, through which the external input/output terminal passes, may be additionally performed on the upper adhesion part. Here, the previously prepared label is punched in the form of the external input/output terminal and then is cut toward the outside.

As described above, since the label according to an embodiment of the present invention is attached to the outside of the battery pack, the battery pack may be maintained in the insulated state in which introduction of static electricity is prevented from the outside, the edge of the battery cell, at which short circuit well occurs, may be wrapped, and the entire configuration of the battery pack may be fixed.

As described above, the technical idea of the present invention has been specifically described with respect to the above embodiments, but it should be noted that the foregoing embodiments are provided only for illustration while not limiting the present invention. Various embodiments may be provided to allow those skilled in the art to understand the scope of the preset invention, but the present invention is not limited thereto.

DESCRIPTION OF SYMBOLS

100: Battery pack
110: Battery cell
111: Electrode assembly
112: PCM accommodation part
113: lead part
114: Case
120: Protection circuit module (PCM)
121: Printed circuit board (PCB)
122: External input/output terminal
123: Upper cover
130: Label
131: Front adhesion part
132: Side adhesion part
1321: Side attachment part
1322: Rear attachment part
1323: Fixing attachment part
133: Upper/lower adhesion part

The invention claimed is:

1. A battery pack comprising:
   a battery cell provided with a lead part comprising a positive lead and a negative lead;
   a protection circuit module (PCM) comprising a protection circuit for controlling an operation of the battery cell and electrically connected and coupled to the lead part of the battery cell; and
   a label wrapping the battery cell, to which the PCM is coupled, so that portions of the label attached to a rear surface of the battery cell, the label comprising:
   a front adhesion part attached to a front surface of the battery cell, the front adhesion part having a top edge, a bottom edge,
   a first side edge and a second side edge; a first side adhesion part connected to the first side edge of the front adhesion part and attached to a left surface of the battery cell and a portion of the rear surface of the battery cell;
   a second side adhesion part connected to the second side edge of the front adhesion part and attached to a right surface of the battery cell and a portion of the rear surface of the battery cell;
   an upper adhesion part connected to the top edge of the front adhesion part and attached to a top surface of the battery cell and a portion of the rear surface of the battery cell;
   a lower adhesion part connected to the bottom edge of the front adhesion part and attached to the rear surface of the battery cell and a portion of the rear surface of the battery cell, and
   wherein each side adhesion part comprises:
      a side attachment part attached to a side surface of the battery cell, the side attachment part having a top edge and a bottom edge, and
      a rear attachment part having a top edge collinear with the top edge of the side attachment part and a bottom edge spaced from the bottom edge of the side attachment part; and
   wherein the PCM comprises an external input/output terminal on one side thereof to electrically connect the battery cell to an external device; and
   wherein a slit through which the external input/output terminal passes is provided in the upper adhesion part; and
   wherein there is a cut perpendicular and connected to the slit forming a T-shape and extending to an upper edge of the upper adhesion part, and there is a cut perpendicular and connected to the slit extending to an upper edge of the upper adhesion part, wherein the slit and the cut are in a form of a T-shape.

2. The battery pack of claim 1, wherein the battery cell comprises an electrode assembly and a case accommodating the electrode assembly, and wherein the label surrounds ends of the case.

3. The battery pack of claim 1, wherein an upper end of the rear attachment part is provided at a same position as an upper end of the side attachment part to match flatness of the rear surface of the battery cell, and wherein a lower end of the rear attachment part is spaced upward from a lower end of the side attachment part so that the rear attachment part does not overlap the upper adhesion part or the lower adhesion part.

4. The battery pack of claim 1, wherein each side adhesion part further comprises a fixing attachment pan overlapping the upper adhesion pan or the lower adhesion part in a longitudinal direction of the battery cell.

5. The battery pack of claim 1, wherein the label is made of an electrically insulating material.

6. A method for manufacturing a battery pack, the method comprising:
- a battery cell preparation step of preparing a battery cell comprising an electrode assembly and an electrolyte;
- a protection circuit module (PCM) mounting step of mounting a PCM on the battery cell prepared in the battery cell preparation step; and
- a labeling step of attaching a label on one surface of the battery cell on which the PCM is mounted through the PCM mounting step,
- wherein the labeling step comprises:
  - a front attachment step of attaching a front adhesion part of the label on a front surface of the battery cell;
  - a side attachment step of attaching a side attachment part of a side adhesion part of the label on a side surface of the battery cell;
  - a rear attachment step attaching a rear attachment part of the side adhesion part of the label on a rear surface of the battery cell
  - an upper attachment step of attaching an upper adhesion part of the label on a top surface of the battery cell;
  - a lower attachment step of attaching a lower adhesion part of the label on the rear surface of the battery cell,
- each side adhesion part comprises:
  - a side attachment part attached to a side surface of the battery cell, the side attachment part having a top edge and a bottom edge aligned with the bottom edge of the front adhesion part; and
  - a rear attachment part having a top edge collinear with the top edge of the side attachment part, and a bottom edge spaced from the bottom edge of the side attachment part; and
- wherein the PCM comprises an external input/output terminal on one side thereof to electrically connect the battery cell to an external device; and
- wherein a slit through which the external input/output terminal passes is provided in the upper adhesion part; and
- wherein there is a cut perpendicular and connected to the slit forming a T-shape and extending to an upper edge of the upper adhesion part, and there is a cut perpendicular and connected to the slit extending to an upper edge of the upper adhesion part, wherein the slit and the cut are in a form a T-shape.

* * * * *